United States Patent
Miura et al.

[11] Patent Number: 6,159,439
[45] Date of Patent: Dec. 12, 2000

[54] PROCESS FOR PRODUCING ALUMINUM NITRIDE

[75] Inventors: Hirohisa Miura; Nagayoshi Matsubara; Masaoki Hashimoto; Junichi Yokka, all of Toyota, Japan

[73] Assignee: Toyota Jidosha Kabushiki Kaisha, Toyota, Japan

[21] Appl. No.: 09/137,755

[22] Filed: Aug. 21, 1998

Related U.S. Application Data

[63] Continuation-in-part of application No. PCT/JP96/03867, Dec. 26, 1996.

[51] Int. Cl.⁷ .................................................. C01B 21/072
[52] U.S. Cl. ............................................................ 423/412
[58] Field of Search ............................................. 423/412

[56] References Cited

U.S. PATENT DOCUMENTS 4,522,660   6/1985   Suzuki et al. .

FOREIGN PATENT DOCUMENTS

| | | |
|---|---|---|
| 0 666 334 A1 | 8/1995 | European Pat. Off. . |
| 11 97 439 | 7/1965 | Germany . |
| 36 41 754 | 6/1988 | Germany . |
| 40-2902 | 2/1965 | Japan ...................................... 423/412 |
| 61-83608 | 4/1986 | Japan ...................................... 423/412 |
| 62-3007 | 1/1987 | Japan . |
| 62-56310 | 3/1987 | Japan ...................................... 423/412 |
| 4-321505 | 11/1992 | Japan ...................................... 423/412 |
| 5-279002 | 10/1993 | Japan . |
| 7-166321 | 6/1995 | Japan . |
| 7-215707 | 8/1995 | Japan . |
| 7-309611 | 11/1995 | Japan . |
| 7-330315 | 12/1995 | Japan . |
| 8-109011 | 4/1996 | Japan . |
| 784 126 | 10/1957 | United Kingdom . |
| 952553 | 3/1964 | United Kingdom ................... 423/412 |
| 1103609 | 2/1968 | United Kingdom ................... 423/412 |

OTHER PUBLICATIONS

Ito et al., "Preparation of A1N Powders by Nitriding of Aluminum Chips", Chemical Abstracts #121:130956, vol. 121, No. 2, Jul. 11, 1994, p. 229.

Kudela et al., "Aluminum Nitride by High Pressure Nitriding of Aluminum–Magnesium Alloys in Liquid State", Chemical Abstracts #96:71267, vol. 96, No. 10, Mar. 8, 1982.

Kudela et al., "Study of Nitridation Process of Aluminum-–Magnesium Alloys", Chemical Abstracts #92:151469, vol. 92, No. 18, May 5, 1980.

G. Boden et al., "Probleme Bei Der Herstellung Von Nitrischen Keramischen Pulvern", Sprechsaal, vol. 122, No. 3, Jan. 1, 1989, pp. 224–231.

Yasuhiro, "Method for Nitriding Aluminum", Patent Abstracts of Japan, May 30, 1997, vol. 1997, No. 5, JP 09–012308.

*Primary Examiner*—Wayne Langel
*Attorney, Agent, or Firm*—Oliff & Berridge, PLC

[57] ABSTRACT

A process for producing aluminum nitride comprises a step of nitriding directly a mixed powder comprising of, a bulky aluminum powder composed of aluminum or an aluminum alloy powder which occupies 50 to 97% by weight and whose sieve opening of JIS is not less than 210 $\mu$m (70 mesh); and a nitriding accelerator powder composed of at least one kind of an aluminum powder and an aluminum alloy powder which occupy the balance of 50 to 3% by weight and whose sieve opening is less than 210 $\mu$m (70 mesh); under a nitrogen gas atmosphere of the temperature ranging from 500 to 1000° C. In the present invention, there can be obtained an aluminum nitride which is easy to be crushed by hand by using a mortar.

15 Claims, 1 Drawing Sheet

PROCESS FOR PRODUCING ALUMINUM NITRIDE

This application is a C-I-P of PCT/JP96/03867, filed Dec. 26, 1996.

FIELD OF THE TECHNOLOGY

The present invention relates to a process for nitriding aluminum, especially to a process for nitriding aluminum which is easy to be crushed.

BACKGROUND OF THE TECHNOLOGY

Aluminum nitride which is obtained by nitriding aluminum completely is superior in thermal conductivity and electric insulating property so that it is used as a substrate material. This aluminum nitride is produced by carbon reduction of alumina or direct nitriding of an aluminum powder. In the direct nitriding methods of the aluminum powder, the following method is practically used in industrial field; the aluminum powder whose particle diameter is not more than 400 $\mu$m is used, a process for nitriding is conducted at the temperature ranging from 900 to 1400° C. and after that, crushing and refining thereof are conducted in the method.

Furthermore, in the direct nitriding methods of an aluminum powder, in order to improve the nitriding property thereof, the following methods are also known: a method in which the aluminum powder is crushed so as to be in a shape of a scale and a mixture of the obtained aluminum powder in the shape of scale and an aluminum nitride powder are used as raw materials; a method in which a metal-aluminum powder whose particle diameter is not more than 250 $\mu$m is applied to nitriding once at a temperature which is not more than the melting point of aluminum, then the obtained product is crushed to have a mean particle diameter not more than 15 $\mu$m and after that nitriding of them are conducted at a temperature ranging from 1300 to 1400° C. (Japanese Unexamined Patent Publication (KOKAI) No. 61-83608); a method in which nitriding of a raw material in which a metal-aluminum powder is mixed with a fluorine included ammonium compound and an aluminum nitride powder is conducted at a temperature ranging from 430 to 650° C. and after that, nitriding of the obtained product is conducted at a temperature ranging from 900 to 1300° C. (Japanese Unexamined Patent Publication (KOKAI) No. 62-3007).

Also, as set forth in Japanese Unexamined Patent Publication (KOKAI) No. 5-279002, there is disclosed a method for producing an aluminum nitride powder whose crushing property is improved by conducting a process for nitriding in the following conditions: particle diameter of aluminum powder being used as a raw material ranges from 10 to 60 $\mu$m, particle diameter of AlN being used as a nitriding accelerator agent which is mixed into ranges from 0.5 to 3 $\mu$m and bulk density of the mixed product ranges from 0.6 to 1.9 g/cm$^3$.

In Japanese Unexamined Patent Publication (KOKAI) No. 5-279002, the upper limit of particle diameter of an aluminum powder raw material which is applied to nitriding is set to be 60 $\mu$m. This is because in the case if the particle diameter thereof exceeds 60 $\mu$m, the enough nitriding reaction is not expected to be proceeded. Therefore, in Japanese Unexamined patent Publication (KOKAI) No. 5-279002, the aluminum powder whose particle diameter exceeds 60 $\mu$m can not be used as a raw material, so that the above-mentioned publication has the disadvantage that it needs to use a fine aluminum powder which is relatively high in cost.

However, if a fine aluminum powder is used as a raw material, the aluminum powder as a raw material is clogged closely at the time of nitriding so that air permeability can not be conducted enough and nitriding reaction is hard to be generated. Accordingly, in order to conduct nitriding enough, temperature of nitriding is set to be high (for example, nitriding is processed under a temperature which is not less than the melting point of aluminum). As the result, after nitriding, aluminum powders strongly aggregate each other so that there arises a disadvantage that the obtained product is not easy to be crushed.

In order to solve the above-mentioned disadvantage, as set forth in Japanese Unexamined Patent Publication (KOKAI) No. 5-279002, by using an ALN powder whose particle diameter is finer compared with the ordinary particle diameter thereof (4 to 10 $\mu$m) and which has the effect to prevent sintering, aluminum powders are properly isolated each other so as to prevent aggregation at the time of nitriding. However, it is necessary to mix a relatively large amount of the ALN powder which is used so that leads to be high in cost and its productivity is inferior. Furthermore, it is necessary to control the bulk density of the mixed product.

The object of the present invention is to solve the problems described above.

DISCLOSURE OF THE INVENTION

In Japanese Unexamined Patent Publication (KOKAI) No. 7-166321, the present inventors suggested that nitriding the surface of an aluminum base material which is hard to be applied to nitriding under normal conditions and which is in block state can be conducted easily by using a nitriding agent. As a nitriding agent, a relatively fine aluminum powder can be used. The effect thereof has not been made clearly yet, however, it is expected that the nitrogen in the generating stage has some relationship with nitriding of aluminum of the base material. The above-mentioned nitrogen at the time of generating is generated at the time when the aluminum powder as a nitriding agent is applied to nitriding.

The present inventors have completed the present invention by considering that nitriding of a relatively large aluminum powder can be conducted easily as in the same way as in the case of the above-mentioned aluminum base material if using the nitriding agent based on the above-mentioned view.

A process for producing aluminum nitride of the present invention comprises a step of: directly nitriding a mixed powder comprising of, when the whole weight thereof is set to be 100% by weight, a bulky aluminium powder composed of aluminum or an aluminum alloy powder which occupies 50 to 97% by weight and whose sieve opening of JIS is not less than 210 $\mu$m (70 mesh); and a nitriding accelerator powder composed of at least one kind of an aluminum powder and an aluminum alloy powder which occupies the balance of 50 to 3% by weight and whose sieve opening of JIS is less than 210 $\mu$m (70 mesh); under a nitrogen gas atmosphere of a temperature ranging from 500 to 1000° C.

In the process for producing aluminum nitride of the present invention, nitriding of the aluminum powder or the aluminum alloy powder whose sieve opening of JIS is less than 210 $\mu$m (70 mesh) is conducted; and because of this nitriding, nitriding of the bulky aluminum powder composed of aluminum or the aluminum alloy powder whose sieve opening of JIS is not less than 210 $\mu$m (70 mesh) is promoted and nitriding thereof is conducted. Owing to this, nitriding of the whole of the mixed raw material powder can be conducted. This mixed raw material includes a large amount of the bulky aluminum powder so that it is easy to supply the nitrogen gas and the nitriding reaction is easily proceeded. Furthermore, the nitriding is conducted at a low temperature which is not more than the melting point of aluminum so that the obtained aluminum nitride is not sintered solidly.

DETAILED EXPLANATION OF THE INVENTION

The mixed raw material powder which is nitrided by the process for producing aluminum nitride of the present invention comprises: when the whole weight thereof is set to be 100% by weight, a bulky aluminum powder composed of aluminum or an aluminum alloy powder which occupies 50 to 97% by weight and whose sieve opening of JIS (hereinafter, the sieve opening indicates JIS standard) is not less than 210 μm (70 mesh); and a nitriding accelerator powder composed of at least one kind of an aluminum powder and an aluminum alloy powder which occupies the balance of 50 to 3% by weight and whose sieve opening is less than 210 μm (70 mesh).

As the bulky aluminum powder, a powder obtained in cutting work is preferable. To put it concretely, machines wastes of aluminum generated by machine works such as cutting, grinding, wire cutting and so on can be used. As for the shape of the bulky aluminum powder, all kinds of a granulated form, a needle form, a strip form or a foiled form may be selected to be used. The aluminum raw material of the form which is bulky so much is inferior in its charging efficiency and the aluminum raw material of the form which has too much thickness needs so much time to conduct nitriding into the core portion thereof. On the other hand, the powder which is too fine generates sintering at the same time of its nitriding so that it is hard to crush the resulting product.

Based on the result of nitriding test of many kinds of raw materials, it is preferable to use the raw material which passes through the sieve opening of 5 mm and which does not pass through the sieve opening of 210 μm (70 mesh). The raw material which passes through the sieve opening of no less than 5 mm is inferior in its charging efficiency and it needs so much time to conduct nitriding into the core portion thereof so that it is not preferable in the present invention. On the other hand, the raw material which passes through the sieve opening of 210 μm (70 mesh) results a hard sintering compact which is hard to be crushed and it is not preferable in the present invention.

A cut wire which is produced by cutting a thin rod is placed on the market for the purpose of shot cleaning. This raw material also passes through the sieve opening of 5 mm and does not pass through the sieve opening of 210 μm so that this raw material can be used as the bulky aluminum powder material of the present invention. The bulk density of this material is not less than 1.2, accordingly, if only this material is charged, the charging efficiency thereof is so improved so that particles sinter each other. Therefore, in the present invention, it is preferable that a mixed raw material is used in an apparent bulk density thereof ranging from 0.1 to 1.2, more preferably ranging from 0.2 to 1.0, by mixing the above-mentioned material with a material whose bulk density is low, such as sawdust (bulk density; 0.2 to 0.8).

The shape of the bulky aluminum powder material is defined as follows: a granulated form, strip form or foiled form whose diameter or length of one side (short side) is preferably not less than 0.2 mm and not more than 5 mm.

This bulky aluminum powder may be pure aluminum particles or aluminum alloy particles which are made to be an alloy with other metals. Especially, it is preferable to use an alloy including magnesium of not less than 0.5% by weight (hereinafter, % means % by weight unless otherwise provided). Aluminum materials are easy to be oxidized, so it is common that the uppermost surface thereof comprises a few natural oxide films so that this oxide film obstructs nitriding. In this case, the above-mentioned problem is solved by using a material including magnesium at an amount of not less than 0.5%. Magnesium is a metal which is easy to be evaporated very much and magnesium has a vapor pressure of about 30 Pa under the atmospheric pressure at the temperature of 540° C. So this magnesium vapor acts as an oxygen getter so that nitriding is supposed to be promoted.

The nitriding accelerator powder comprises at least one kind of the aluminum powder and the aluminum alloy powder whose sieve opening is less than 210 μm. As these aluminum powder or aluminum alloy powder an ordinary atomized powder can be used. Especially it is preferable to use an ordinary atomized powder whose sieve opening is not more than 150 μm (100 mesh). Also, as in the same way as that of the above-mentioned bulky aluminum powder, the aluminum alloy powder including magnesium at an amount of not less than 0.5% is preferably used.

The bulky aluminum powder and the nitriding accelerator powder which constitute this mixed raw material powder: bulky aluminum powder is in an amount of from 50 to 97% and the nitriding accelerator powder is in an amount of 50 to 3% which occupies the balance thereof when the whole weight of the mixed material powder is set to be 100%. In view of preventing sintering, it is to be desired to reduce the nitriding accelerator powder. However, in view of improving reactively of nitriding, it is to be desired that the nitriding accelerator powder is blended at an amount of not less than 3% or more preferably an amount of not less than 5%.

Further, it is desired that the amount of the nitriding accelerator powder is increased according to the increase of the size of the raw material. Accordingly, there is no problem when the nitriding accelerator powder is blended at an amount of 50% with regard to its reactivity, however, with regard to crushing property after treatment, it is to be desired that the nitriding accelerator powder is blended at an amount of not more than 40%.

An aluminum nitride powder can be blended in this mixed material powder. This aluminum nitride powder has the function for preventing fixing and sintering of the aluminum powder each other. The aluminum nitride powder is preferably blended in an amount of from 5 to 20% when the whole of the mixed material powder is set to be 100%. It is not preferable to add the aluminum nitride powder in an amount of exceeding 30% with regard to yield rate.

In an accumulation condition of the mixed powder which is subjected to nitriding, it is preferable to employ the bulk density thereof in an amount of form 0.1 to 1.2 and more preferably in an amount of from 0.2 to 1.0.

Nitriding is conducted under the atmosphere of pure nitrogen gas. Here, the purity of the pure nitrogen gas is not less than 99.9% and the most important thing is that there is no inflow of air from the pipe arrangement and so on and it is controlled by measuring dew point under the atmosphere of the inside of a furnace. The dew point is usually controlled to be not more than −20° C.

The nitriding temperature ranges from 500 to 1000° C. If the nitriding temperature is less than 500° C., the nitriding speed is decreased and these is a case that the reaction is not conducted practically. However, if the nitriding temperature exceed 1000° C., a rapid nitriding reaction is generated and this causes sintering among materials so that the nitriding rate is rather decreased. It is known that the lower the treatment temperature is, the finer particles can be obtained.

The nitriding time ranges from about 3 to 15 hours.

The nitriding may be conducted at one step at a temperature ranging from 500 to 1000° C. Otherwise, the nitriding may be conducted at two steps as follows: the first nitriding is conducted at a first nitriding temperature which is not higher than the melting point of aluminum or the aluminum alloy material, and subsequently, a second nitriding is conducted at the second nitriding temperature which is higher than the melting point of aluminum or the aluminum alloy material and which is lower than 1000° C. Furthermore, the first nitriding and the second nitriding may be respectively conducted at more than two kinds of the first nitriding temperature and at more than two kinds of the second nitriding temperature.

To be concrete, it is preferred that the nitriding is conducted for one to six hours at a temperature ranging from 540 to 570° C. as the first nitriding temperature which is not more than the melting point of aluminum or the aluminum alloy so that about 5 to 60% of the mixed material powder becomes aluminum nitride; and after that, furthermore, the nitriding of the remaining aluminum of the mixed material powder is conducted at a second nitriding temperature, for example, not less than 750° C. so that the nitriding rate of the whole may reaches less than 95%. If the nitriding treatment is conducted at a temperature of more than 1000° C., a solid sintered body is obtained and it is not preferred in view of crushing. The lower the second nitriding temperature is, the finer grains can be obtained.

At the process for nitriding of aluminum of the present invention, there can be obtained aluminium nitride or aluminum nitride which includes metal aluminum and whose nitriding rate is 40 to 100% and which is superior in crushing property. The aluminum nitride exists as the aluminum nitride particle or a needle shape crystal with a diameter of not more than 1 $\mu$m in an aluminum matrix.

Furthermore, the resulting aluminum nitride or the resulting aluminum nitride including metal aluminum may be crushed in the dry air so that the amount of oxygen of thus obtained powder can reach not less than 0.4%. The generated aluminum nitride material is easy to absorb water content in air and this impairs corrosion resistance. In order to avoid the above-mentioned disadvantage, it is effective to conduct crushing treatment by a ball mill or a vibration mill in the dry air rapidly successively after the nitriding treatment so that the amount of oxygen of the obtained powder can reach not less than 0.4%. Owing to this, the conductive property of the material can be avoided.

The product (cake) of the aluminum nitride produced by the method of the present invention has the crushing property in which the product can be easily crushed by manual hands by using an ordinary mortar. As mentioned above, the product is superior in crushing property so that after cutting up roughly by a press of a light load generally, it is easy to crush to obtain a powder of a desired size by using a ball mill.

In the process for nitriding of aluminum of the present invention, the nitriding is conducted under the atmosphere of pure nitrogen gas of 500 to 1000° C., a bulky aluminum powder of a large size which retards the nitriding and an aluminum powder of a small size which accelerates the nitriding are constructed to be the mixed powder so that a mild nitriding is progressed. Accordingly, the aluminum nitride which is easy to be crushed can be obtained.

In the product produced by the present invention, the powder whose specific surface area is small has improved flowability, so that, for example, in the case of mixing into the resin for sealing semiconductor, it is easy to be mixed and therefore a large amount of mixing can be conducted so as to improve thermal conductivity. In the present invention, it is possible to produce such a kind of aluminum powder whose specific surface area is small easily.

PREFERRED EMBODIMENTS

Figure 1:
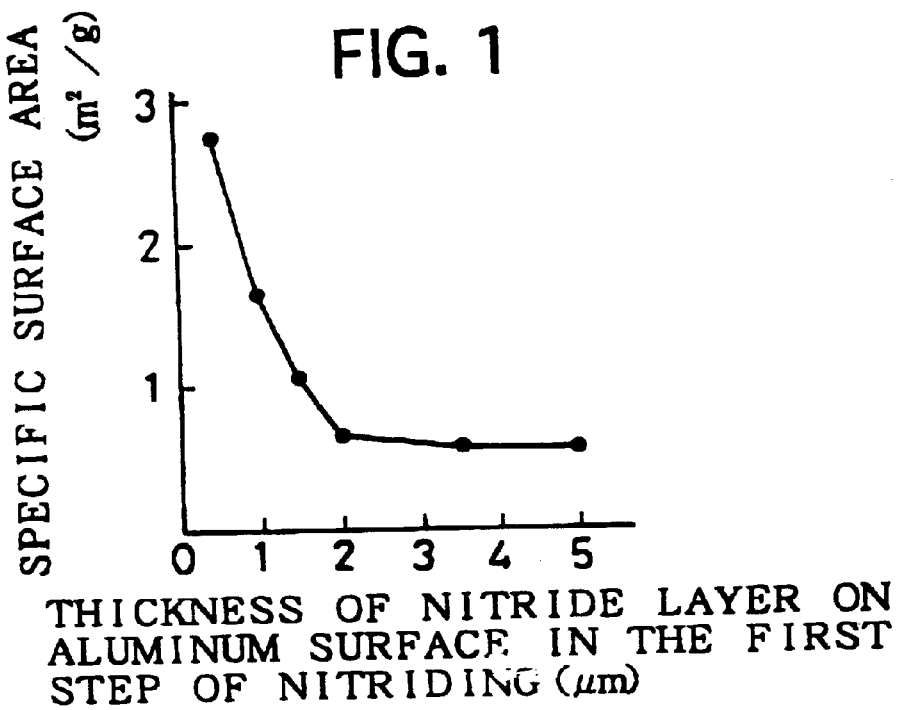
FIG. 1 is a diagram for showing a relationship between the thickness of the nitrided layer and the specific surface area of the nitrided powder.

Hereinafter, the Preferred Embodiments are shown and the process for nitriding of the present invention will be explained in details.

As a bulky aluminum powder which constitutes the mixed raw material powder and a aluminum powder which constitutes a nitriding accelerator powder, a variety of aluminum cutting work junks and an atomized powder which are generated industrially at a large amount and which are shown in the following TABLE 1. As an aluminum nitride powder used for preventing sintering, the aluminum nitride powder whose particle diameter ranges from 5 to 100 $\mu$m was used.

TABLE 1

| RAW MATERIAL | CONTENTS | APPARENT DENSITY |
|---|---|---|
| A | SAW JUNKS OF GENERATED ALUMINUM SASH GENERATED AT A FACTORY (MATERIAL: 6063) SIEVE OPENING: SIFTED AT 5 mm (SIEVE OPENING: CONFIRMED THAT IT DOES NOT PASS 210 $\mu$m) | 0.34 |
| B | THE ABOVE-MENTIONED A IS SIFTED FURTHER BY SIEVE OPENING: 714 $\mu$m (24 MESH) | 0.56 |
| C | SAW JUNKS OF ALUMINUM MATERIAL GENERATED AT A FACTORY (MATERIAL: 6061) SIEVE OPENING: SIFTED AT 5 mm (SIEVE OPENING: CONFIRMED THAT IT DOES NOT PASS 210 $\mu$m) | 0.76 |
| D | CUT WIRE FOR SHOT CLEANING, DIAMETER: 1.2 mm (COMMERCIAL ITEM, MATERIAL: PURE ALUMINUM) | 1.56 |
| E | CUT WIRE FOR SHOT CLEANING, DIAMETER: 0.6 mm (COMMERCIAL ITEM, MATERIAL: PURE ALUMINUM) | 1.62 |
| F | ALUMINUM POWDER (MATERIAL: Al-2.5 Mg) PARTICLE DIAMETER: 10~60 $\mu$ | 1.35 |

Material: 6063 is Al-0.2~0.6% Si-0.45~0.9% Mg and
Material: 6061 is Al-0.4~0.8% Si-0.8~1.2% Mg.

TABLE 2

| No. | BULKY ALUMINUM % | NITRIDING ACCELERATOR POWDER | TREATED AMOUNT (g) | APPARENT DENSITY | NITRIDING CONDITION | NITRIDING RATE % | CRUSHING PROPERTY |
|---|---|---|---|---|---|---|---|
| 1 | A | Al-2.5 Mg POWDER (5%) | | | | | |
| | 90 | + AlN POWDER (5%) | 30 | 0.44 | ① | 98.5 | GOOD |
| 2 | A | Al-2.5 Mg POWDER (10%) | | | | | |
| | 80 | + AlN POWDER (10%) | 30 | 0.71 | ① | 99.5 | GOOD |
| 3 | C | Al-1.0 Mg POWDER (5%) | | | | | |
| | 95 | + AlN POWDER (NONE) | 30 | 0.79 | ① | 99.7 | GOOD |
| 4 | A | PURE ALUMINUM POWDER (5%) | | | | | |
| | 85 | + AlN POWDER (10%) | 30 | 0.48 | ② | 99.1 | GOOD |
| 5 | E + A | Al-2.5 Mg POWDER (10%) | | | | | |
| | 70 | + AlN POWDER (20%) | 50 | 1.07 | ① | 98.0 | GOOD |
| 6 | D + A | Al-7.0 Mg POWDER (5%) | | | | | |
| | 75 | + AlN POWDER (20%) | 50 | 1.03 | ① | 98.2 | GOOD |
| 7 | A | Al-2.5 Mg POWDER (5%) | | | | | |
| | 90 | + AlN POWDER (5%) | 30 | 0.44 | ③ | 93.8 | GOOD |

TABLE 3

| NO. | BULKY ALUMINUM % | NITRIDING ACCELERATOR POWDER | TREATED AMOUNT | APPARENT DENSITY | NITRIDING CONDITION | NITRIDING RATE % | CRUSHING PROPERTY |
|---|---|---|---|---|---|---|---|
| 11 | D | Al-7.0 Mg POWDER (15%) | | | | | SOLIDLY SINTERED |
| | 65 | + AlN POWDER (20%) | 50 | 1.47 | ① | 83.2 | |
| 12 | D | Al-40 Mg POWDER (15%) | | | | | SOLIDLY SINTERED |
| | 65 | + AlN POWDER (20%) | 50 | 1.47 | ② | 89.0 | |
| 13 | E | Al-7.0 Mg POWDER (15%) | | | | | SOLIDLY SINTERED |
| | 65 | + AlN POWDER (20%) | 50 | 1.51 | ① | 91.7 | |
| 14 | F | | | | | | SOLIDLY SINTERED |
| | 100 | NOT BLENDED | 30 | 1.35 | ① | 97.8 | |
| 15 | A | | | | | | GOOD |
| | 100 | NOT BLENDED | 30 | 0.34 | ① | 91.9 | |

The mixed material powders shown in TABLE 2 and TABLE 3 were prepared by using raw material powders shown in TABLE 1. TABLE 2 and TABLE 3 also show the treated amount of the mixed raw material powders which are applied to nitriding, and furthermore, the apparent density, nitriding rate and crushing property of the obtained nitrided product which will be explained later.

The nitriding was conducted by using a muffle electric furnace made of heat resisting steel. This electric furnace is used in sintering of the ordinary iron-based sintered material. This electric furnace has the structure in which it is not sealed completely and in which a middle shutter is included in the middle thereof. An introduction gas is constructed so as to enter into the furnace from the upper side of the middle portion, jet across at the inner part of the muffle and be exhausted from an insertion opening. The furnace capacity is about 16 liter. This electric furnace is not considered to be optimum for the experiment of nitriding. However, if the nitriding can not be conducted by using this kind of furnace, it is considered that the nitriding can not be realized industrially, so that this electric furnace was used.

The method of experiment is as follows: after the mixed raw material powder (about 20 to 70 g) of the nitrided raw material, which is shown in TABLE 2 and 3, was inserted thinly and uniformly on a tray made of graphite, the inside of the furnace was displaced by the nitrogen gas (gas introduction amount; 30 L/minute, required time; about 5 hours). After that, it was heated at the predetermined nitriding temperature at the speed of 100° C. per one hour, and the predetermined time nitriding was conducted at the above-mentioned temperature. The nitriding temperature and the treatment conditions are shown in TABLE 4. The introduction amount of the pure nitrogen gas is 30 liter per one minute. After nitriding, it was cooled in the furnace and the nitride was obtained.

TABLE 4

| NITRIDING CONDITION | FIRST NITRIDING | SECOND NITRIDING |
| --- | --- | --- |
| TREATMENT CONDITION 1 | 540° C. × 5 Hr | 850° C. × 3 Hr |
| TREATMENT CONDITION 2 | 540° C. × 1 Hr + 570° C. × 5 Hr | 850° C. × 3 Hr |
| TREATMENT CONDITION 3 | 540° C. × 1 Hr + 570° C. × 5 Hr | 700° C. × 1 Hr + 950° C. × 1 Hr |

As is clear from TABLE 2, all of the products in which the mixed raw material powder shown in No. 1 to No. 7 are applied to nitriding show the high nitriding rate in which nitriding rate is not less than 98.0%. Furthermore, the crushing property is about an extent in which it is crushed in a mortar after taking of the stiffness by massaging of hands so that it is easy to produce the nitrided powder.

The mixed raw material powders (as the bulky aluminum powder, a cut wire is used in any case) of No. 11 to No. 13 shown in TABLE 3 have higher apparent densities, such as 1.47 and 1.51. In these mixed raw material powders, even though nitriding accelerator powder is blended, the nitriding rates thereof are lower rates, such as 83.2%, 89.0% and 91.7%. It is estimated that it is because the nitriding is not conducted into the core portion of the raw materials. Furthermore, the obtained nitride is sintered solidly so that it is hard to be crushed.

In No. 14, the nitriding accelerator powder was not blended so that as a representative example of the prior art, No. 14 was tested. The nitriding rate thereof is high and 97.8, however, the obtained nitride is sintered solidly so that it is hard to be crushed.

In No. 15, the nitriding accelerator powder was not blended and the nitrided raw material becomes the bulky aluminum powder. The obtained nitride is not sintered and it is good to be crushed. However, the nitride whose nitriding rate is low, that is, 91.9% was only obtained. The nitriding rate reached to be 91.9% even through the nitriding accelerator powder was not blended. This is because the bulky aluminum powder includes Mg component to some extent (about 0.6%) so that Mg accelerates nitriding thereof.

As shown in No. 11 to 13, the nitrides which are obtained when the apparent density is higher are sintered solidly. however, as shown in No. 5 and No. 6 of TABLE 2, the nitrides which are obtained when the apparent densities thereof are regulated to be lower by mixing a voluminous bulky aluminum powder are good in crushing property.

The bulky density was measured based on JIS Z2504. The nitrides which are good in crushing property were crushed by hand and after that crushing thereof was conducted by the ball mill in alcohol so as to obtain products having the particle diameter being 0.1 to 70 μm (D50=12.7 μm) and the specific surface being 2.1 cm$^2$/g. However, the crushing properties thereof are good so that it is possible to adjust the particle size distribution thereof.

5% of an aluminum nitride powder whose average particle diameter is 15 μm and Al-2,5% Mg alloy powder whose particle diameter is 5 μm were added to the aluminum material (material JIS 6063) whose length of one side is 0.5 to 2.0 mm and which is in a shape of a strip and they were mixed together; and a first step of nitriding was conducted on it in the nitrogen gas atmosphere (dew point −70° C.) at the temperature of 545° C. for 4 hours; so that a nitrided layer being 3 to 4 μm were obtained on the surface of aluminum. Next, a second step of nitriding was conducted similarly in the nitrogen gas atmosphere at the temperature of 950° C. for 3 hours, so that nitriding of the whole thereof was conducted. Then, after the obtained material was crushed by using rough crusher (jaw crusher), it was ground by using the ball mill for 1 hour so that the aluminum nitride powder whose average particle diameter is 15 μm was obtained. The specific surface area of this aluminum nitride powder was measured to be 0.6 m$^2$/g.

As a comparative example, by using the similar material powder, the first step of nitriding at a temperature of 545° C. for 4 hours and the second step of nitriding at a temperature of 750° C. for 3 hours were conducted. In this case, the measured specific surface area was 4.3 m$^2$/g and this is larger than the specific surface area of the above-mentioned embodiment.

Figure 2:
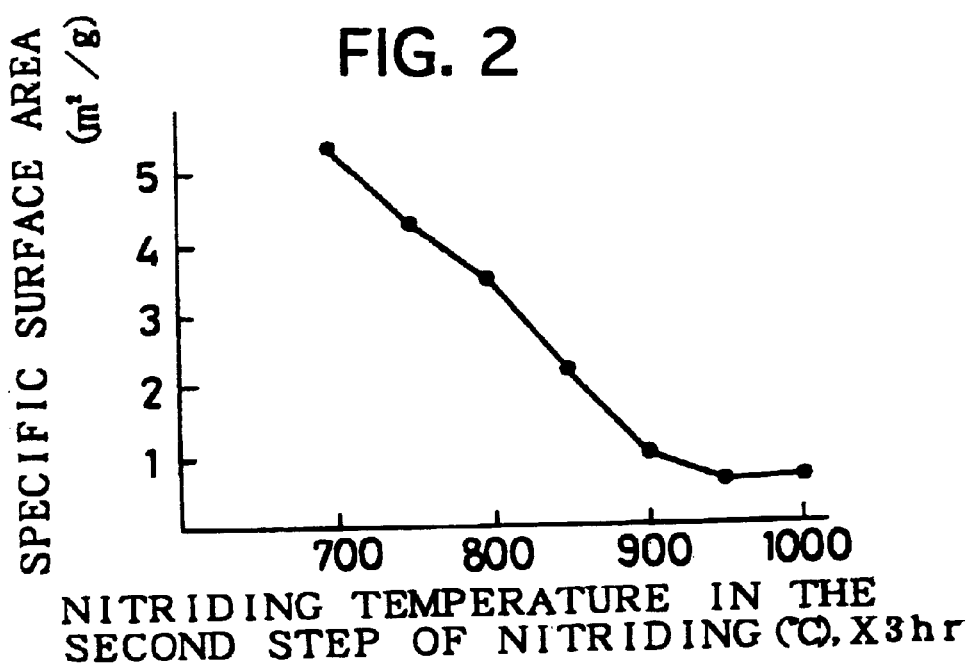
FIG. 2 is a diagram for showing a relationship between a nitriding temperature and the specific surface area of the obtained nitrided powder.

For reference, the relationship between the thickness of the nitrided layer of the powder which was nitrided at a temperature which was under the melting point of the aluminum powder and the specific surface area of the nitrided powder is shown in FIG. 1. As is shown in FIG. 1, the thicker the thickness of the nitrided layer of the obtained powder becomes, the smaller amount of specific surface area of the obtained powder becomes. The first nitriding was conducted under a temperature which did not reach the melting point of the aluminum powder, then the second nitriding was conducted under the melting point thereof. The relationship between the nitriding temperature of the second step and the specific surface area of the obtained powder in the above-mentioned case is shown in FIG. 2. The higher the nitriding temperature of the second nitriding is, the small the specific surface area of the obtained nitrided powder is.

The powder whose specific surface area is small has improved flowability. Namely, a powder whose specific surface area is small is easy to be slid each other so that the flowability thereof is high. When the flowability is high, the amount of blending of powder which can be blended into resin constituting a matrix can be set relatively high. For example, when the aluminum nitride powder is blended into resin for sealing of a semiconductor, even if the blending amount of the aluminum nitride powder is increased, the flowability of the obtained resin composition is hard to be inhibited. Accordingly, by using the aluminum nitride powder whose flowability is high is used, more amount of aluminum nitride powder can be blended. Therefore, the heat conductivity of the obtained sealing material becomes high so that a cooling property of the semiconductor is improved.

Possibility of Utilizing Industrially

As mentioned above, in the process for producing aluminum nitride of the present invention, it is possible to produce aluminum nitride at low cost because aluminum wastes produced at a large amount at plants can be utilized as raw materials. In the process for producing aluminum nitride of the present invention, the nitriding rate is high and not less than 98% and the crushing property thereof is good so that the obtained product can be produced in the shape in which it can be utilized easily as fine particles.

What is claimed is:

1. A process for producing aluminum nitride comprising forming a mixed powder comprising, when the whole weight thereof is set to be 100% by weight, 50 to 97% by weight of a bulky aluminum powder composed of aluminum or an aluminum alloy powder whose sieve opening of JIS is not less than 210 μm (70 mesh) and a balance of 3 to 50% by weight of a nitriding accelerator powder composed of at least one kind of an aluminum alloy powder including magnesium in an amount of not less than 0.5% by weight whose sieve opening of JIS is less than 210 μm (70 mesh), and then nitriding directly the mixed powder under a nitrogen gas atmosphere at a temperature ranging from 500 to 1,000° C.

2. The process for producing aluminum nitride according to claim 1, wherein said bulky aluminum powder is a cutting work powder.

3. The process for producing aluminum nitride according to claim 2, wherein said cutting work powder is a powder which passes through sieve opening of JIS of 5 mm.

4. The process for producing aluminum nitride according to claim 1, wherein said bulky aluminum powder is in a shape of a needle, a strip or a foil whose diameter or whose length of one side (short side) is not less than 0.2 mm and not more than 5 mm.

5. The process for producing aluminum nitride according to claim 1, wherein said bulky aluminum powder is an aluminum alloy powder including not less than 0.5% by weight of magnesium.

6. The process for producing aluminum nitride according to claim 1, wherein said aluminum powder and said aluminum alloy powder are atomized powders whose sieve opening is not more than 150 μm (100 mesh).

7. The process for producing aluminum nitride according to claim 1, wherein said mixed powder includes aluminum nitride powder.

8. The process for producing aluminum nitride according to claim 1, wherein the mixing amount of said aluminum nitride powder is 5 to 20% by weight when the whole weight of said mixed raw material powder is set to be 100% by weight.

9. The process for producing aluminum nitride according to claim 1, wherein said direct nitriding comprises: a predetermined time nitriding at a first nitriding temperature which is not more than the melting point of aluminum or an aluminum alloy constituting said bulky aluminum powder and nitriding accelerator powder; and after that, a predetermined time nitriding at a second nitriding temperature which is more than the melting point of aluminum or an aluminum alloy constituting said bulky aluminum powder and nitriding accelerator powder.

10. The process for producing aluminum nitride according to claim 1, wherein said process for producing aluminum nitride comprises steps of: nitriding 5 to 60% by weight of said mixed powder at said first nitriding temperature; and successively nitriding not less than 95% by weight of said mixed powder at said second nitriding temperature.

11. The process for producing aluminum nitride according to claim 1, wherein a deposited state of said mixed powder which is applied to nitriding has bulk density of 0.1 to 1.2.

12. The process for producing aluminum nitride according to claim 1, wherein a deposited state of said mixed powder which is supplied to nitriding has a bulk density of 0.2 to 1.0.

13. The process for producing aluminum nitride according to claim 1, wherein said process for nitriding an aluminum further comprises a step of: successively after nitriding, crushing nitrided nitride in a dry air so that an oxygen amount of the obtained powder becomes not less than 0.4%.

14. The process for nitriding aluminum according to claim 1, wherein a nitriding rate of the nitriding is not less than 98%.

15. The process for nitriding aluminum according to claim 1, wherein the bulky aluminum powder is an aluminum powder.

* * * * *